Patented Feb. 2, 1937

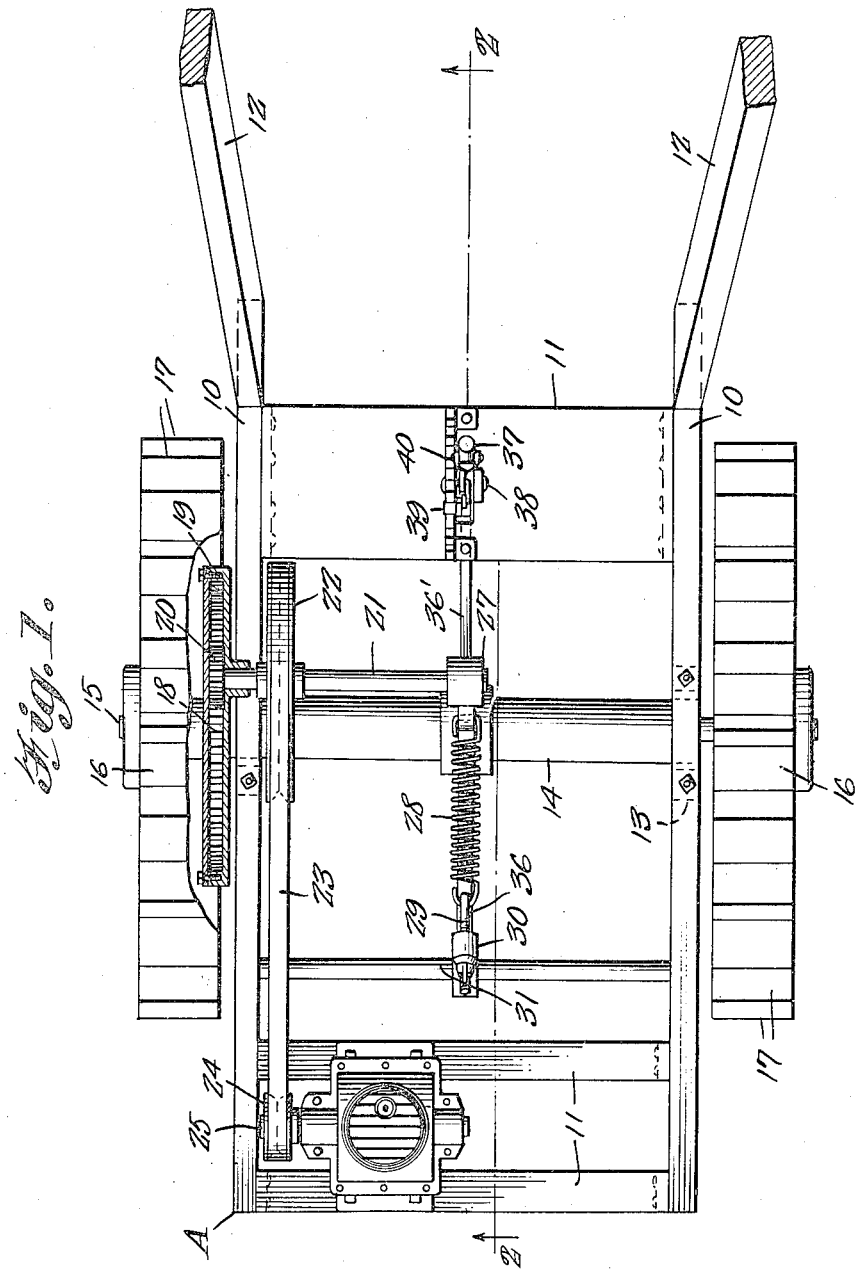

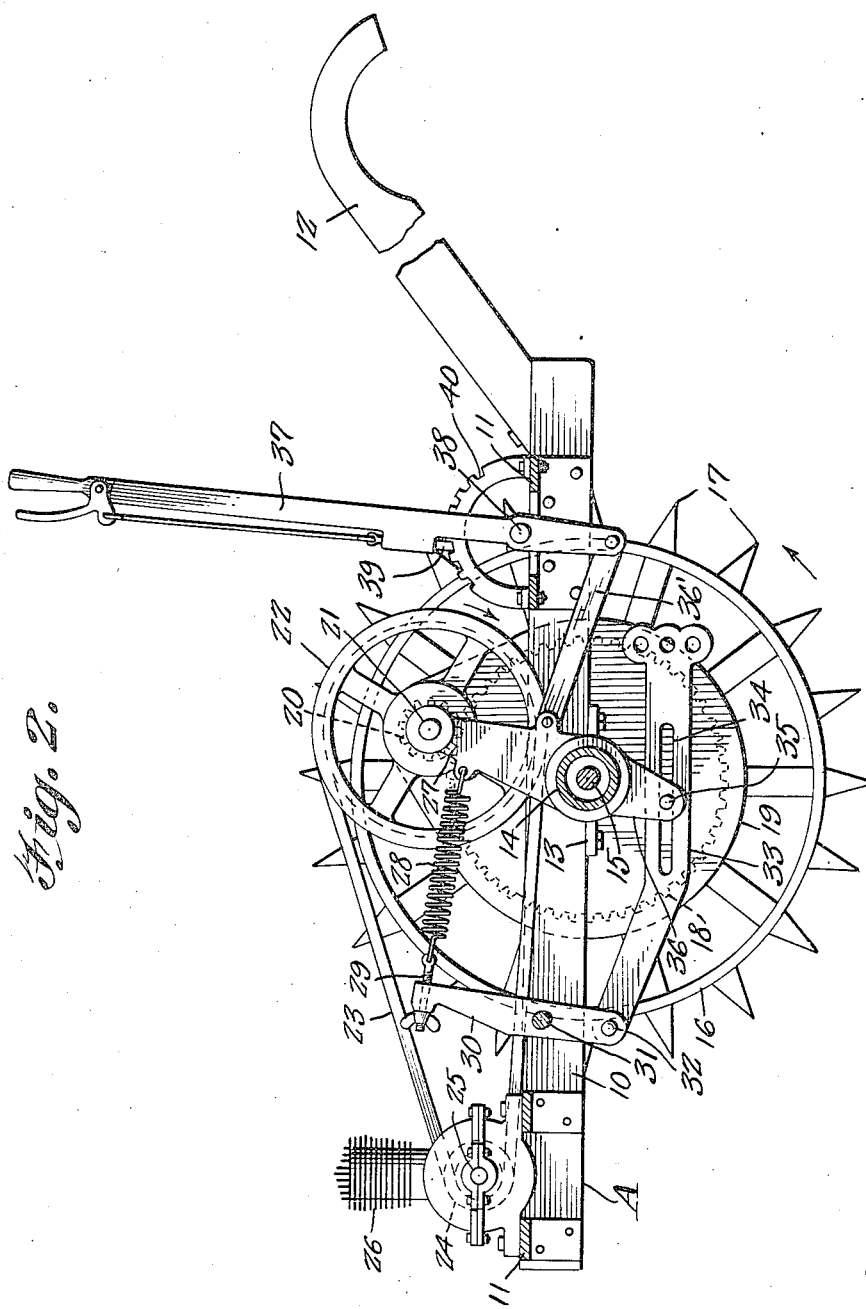

2,069,245

UNITED STATES PATENT OFFICE 2,069,245

TRACTOR

Harley O. Haines, Marion, Ohio, assignor of one-half to Wood A. Stanburrough, Marion, Ohio Application October 23, 1935, Serial No. 46,400

3 Claims. (Cl. 180—19)

The invention relates to a tractor and more especially to a two-wheel tractor.

The primary object of the invention is the provision of a tractor of this character, wherein a pivoted stand has journaled in its upper end a jack shaft carrying the drive pulley and the drive pinion and this stand can be manually adjusted to tighten or loosen the drive belt operating the drive pulley from a motor, a compensator and a compensating draw bar being provided so that strain upon the lever for adjusting the stand will be countered when the tractor is working under a load, the tractor being useful for all farming equipment, such as plows, cultivators or other machinery.

Another object of the invention is the provision of a tractor of this character, which is comparatively simple in its construction, thoroughly reliable and efficient in operation, readily and easily handled, serviceable for heavy loads, strong, durable, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a top plan view of a tractor constructed in accordance with the invention.

Figure 2 is a sectional view on the line 2—2 of Figure 1 looking in the direction of the arrows.

Similar reference characters indicate corresponding parts throughout the several views in the drawings.

Referring to the drawings in detail, the tractor comprises a frame A which includes spaced parallel side beams 10 and cross connecting pieces 11, these being joined to the beams in any suitable manner to provide a rigid stand. The side beams carry at their rear ends upper divergent handle bars 12 and fitted intermediate of this frame are suitable bearings 13 for rotatably accommodating a tubular axle housing 14. Passed through this housing 14 transversely of the stand is the axle 15 of traction wheels 16, these being arranged at opposite sides of the stand and carry at their peripheral treads calks 17, these being spaced an equidistance from each other and are mounted in the wheels in any suitable manner so as to prevent slipping of the tractor in the travel thereof.

Fixed to the axle 15 is a driving gear 18, the same being contained within a casing 19, rigidly secured to the housing 14 and has meshing therewith a drive pinion 20 fixed to a jack shaft 21 which also has fixed thereto a pulley 22 having trained thereover a belt 23, the same being also trained over a pulley 24 fixed to the power shaft 25 of a motor or power unit 26. The power unit 26 is in the form of an internal combustion engine and is supported upon the stand constituted by the frame A. The jack shaft 21 is journaled in a swinging arm or bearing stand 27 rigidly with the housing 14 and with this arm or stand 27 is connected a compensating spring 28 which is also engaged with an adjusting device 29 fixed in a swinging draw bar hanger 30 joined with a rocking rod 31, the device being attached to the upper end of said hanger 30 which latter has pivoted to its lower end at 32 a draw bar 33 for a load. The draw bar 33 has the slot 34 for a pin 35 in an extension 36 on the stand or arm 27.

Connected with the arm or stand 27 is a link 36' which is also connected with a spring latched hand released throw lever 37 swingingly supported at 38 and its latch 39 engages with a toothed keeper segment 40 stationarily mounted on the frame A. The lever 37 is for the purpose of shifting the arm or stand 27 and the latch 39 locks such lever in its adjusted position.

The compensating spring 28 can be regulated by the device 29 as will be apparent from Figure 2 of the drawings.

The gear casing 19 is rigid with the housing 14 and is susceptible of rotary motion when the lever 37 is manually adjusted for the tightening or loosening of the belt 23.

When the tractor is operated under a load through the belt and pulley connections with the motor, the tendency of the drive pinion 20 is to climb upon the gear 18 in a rearward direction due to the direction of travel of the belt between the said motor and the pulley wheel 22. Therefore a hanger 30 having connection by the spring 28 with the stand or arm 27 and with the draw bar 33, effects a compensator to counter the strain upon the latch 39 and the lever 37. The lever 37 is operated when released by the catch or latch 39 from the keeper segment 40 to turn the arm or stand 27 and in doing this the belt 23 can be slackened or tightened and thus interrupt or effect drive of the vehicle.

Now it is to be understood that the arm or stand 27 is rigid with the housing 14 which is rotatable in the bearings 13 and likewise the casing 19 is rigid with said housing 14 so that these parts turn as a unit when the lever 37 is adjusted by reason of the connection of the link 36' with the arm or stand 27'.

What is claimed is:

1. In a tractor, a frame, an axle housing journaled on said frame, an axle passed through the housing and having traction wheels, a gear fixed to said axle, a rocking arm rigid with said housing, a jack shaft journaled in said arm and having a pinion fixed thereto meshing with said gear, a draft bar, a lever pivoted in the frame and pivoted to said draft bar, an adjusted tensioning spring connected with said arm and said lever, power means including a belt and pulley system driving said jack shaft and supported by said frame, and means for shifting the said arm.

2. In a tractor, a frame, an axle housing journaled on said frame, an axle passed through the housing and having traction wheels, a gear fixed to said axle, a rocking arm rigid with said housing, a jack shaft journaled in said arm and having a pinion fixed thereto meshing with said gear, a draft bar, a lever pivoted in the frame and pivoted to said draft bar, an adjusted tensioning spring connected with said arm and said lever, power means including a belt and pulley system driving said jack shaft and supported by said frame, means for shifting the said arm, and a loose connection between the draft bar and the said arm.

3. In a tractor, a frame, an axle housing journaled on said frame, an axle passed through the housing and having traction wheels, a gear fixed to said axle, a rocking arm rigid with said housing, a jack shaft journalled in said arm and having a pinion fixed thereto meshing with said gear, a draft bar, a lever pivoted in the frame and pivoted to said draft bar, an adjusted tensioning spring connected with said arm and said lever, power means for driving said jack shaft and supported by said frame, belt and pulley connections between the power means and said jack shaft, means for shifting the said arm, a loose connection between the draft bar and the said arm, means for latching the last-named means in adjusted position, and means for adjusting the tension of said spring.

HARLEY O. HAINES.